(12) United States Patent
Saleem

(10) Patent No.: US 9,786,168 B2
(45) Date of Patent: Oct. 10, 2017

(54) SYSTEM, METHOD, AND APPARATUS FOR PROVIDING ROAD SEPARATION AND TRAFFIC SAFETY

(71) Applicant: University of Dammam, Dammam (SA)

(72) Inventor: Muhammad Saleem, Dammam (SA)

(73) Assignee: Imam Abdulrahman bin Faisal University, Dammam (SA)

( * ) Notice: Subject to any disclaimer, the term of this patent is extended or adjusted under 35 U.S.C. 154(b) by 0 days.

(21) Appl. No.: 14/878,583

(22) Filed: Oct. 8, 2015

(65) Prior Publication Data

US 2016/0180706 A1  Jun. 23, 2016

Related U.S. Application Data

(60) Provisional application No. 62/094,745, filed on Dec. 19, 2014, provisional application No. 62/201,985, filed on Aug. 6, 2015.

(51) Int. Cl.
  *G08G 1/095* (2006.01)
  *G02B 27/01* (2006.01)

(52) U.S. Cl.
  CPC ......... *G08G 1/095* (2013.01); *G02B 27/0101* (2013.01)

(58) Field of Classification Search
  CPC . B60W 30/10; E01F 9/20; E01F 9/512; E01F 9/524; E01F 9/547; E01F 9/559; E01F 9/576; G02B 27/0101; Y02B 20/72
  (Continued)

(56) References Cited

U.S. PATENT DOCUMENTS 4,570,207 A * 2/1986 Takahashi ............... E01F 9/582
 340/944
5,825,544 A * 10/1998 Poisson .................. G02B 5/128
 359/515

(Continued)

FOREIGN PATENT DOCUMENTS

CN  101538834 A  9/2009
GB  2502323 A  11/2013
(Continued)

OTHER PUBLICATIONS

Heijmans and Studio Roosegaarde, "Smart Highway—The intelligent and interactive roads of tomorrow", http://www.smarthighway.net/, Dec. 2, 2014, 14 pages.

(Continued)

*Primary Examiner* — Naomi Small
(74) *Attorney, Agent, or Firm* — Oblon, McClelland, Maier & Neustadt, L.L.P.

(57) ABSTRACT

A system includes a display layer disposed beneath one or more layers of a road that is configured to output light to illuminate an upper surface of the road. One or more vertical cylindrical voids extend from the display layer to the upper surface of the road providing a path for the light from the display layer to reach the upper surface of the road. Circuitry is configured to determine a traffic scheme for the road based on traffic data received from one or more sources. Control signals are issued to the display layer to control illumination of the upper surface of the road in accordance with the traffic scheme. Traffic scheme-specific values are output to a smart vehicle corresponding to one or more smart vehicle algorithms.

19 Claims, 11 Drawing Sheets

(58) Field of Classification Search
USPC .......................................................... 340/907
See application file for complete search history.

(56) References Cited

U.S. PATENT DOCUMENTS

| | | | | |
|---|---|---|---|---|
| 7,147,400 | B2* | 12/2006 | Van Der Poel | E01F 9/20 |
| | | | | 116/63 R |
| 2006/0267795 | A1* | 11/2006 | Draaijer | G08G 1/04 |
| | | | | 340/907 |
| 2007/0048084 | A1* | 3/2007 | Jung | G09F 9/30 |
| | | | | 404/9 |
| 2007/0276581 | A1* | 11/2007 | Bae | G08G 1/16 |
| | | | | 701/117 |
| 2011/0032121 | A1* | 2/2011 | Beuvink | G08G 1/04 |
| | | | | 340/942 |
| 2011/0273906 | A1* | 11/2011 | Nichol | G02B 6/0076 |
| | | | | 362/607 |
| 2013/0116859 | A1* | 5/2013 | Ihlenburg | G06F 17/00 |
| | | | | 701/2 |
| 2015/0123817 | A1* | 5/2015 | Almalki | F03D 9/00 |
| | | | | 340/907 |
| 2015/0353082 | A1* | 12/2015 | Lee | B60W 30/09 |
| | | | | 701/41 |

FOREIGN PATENT DOCUMENTS

| | | |
|---|---|---|
| JP | 2002-227147 A | 8/2002 |
| WO | WO 02/17266 A2 | 2/2002 |

OTHER PUBLICATIONS

Muhammad Saleem, et al., "Development, Testing, and Implementation Strategy of a Translucent Concrete-Based Smart Lane Separator for Increased Traffic Safety" 2016, ASCE's Journal of Construction Engineering & Management (ISI Journal).

* cited by examiner

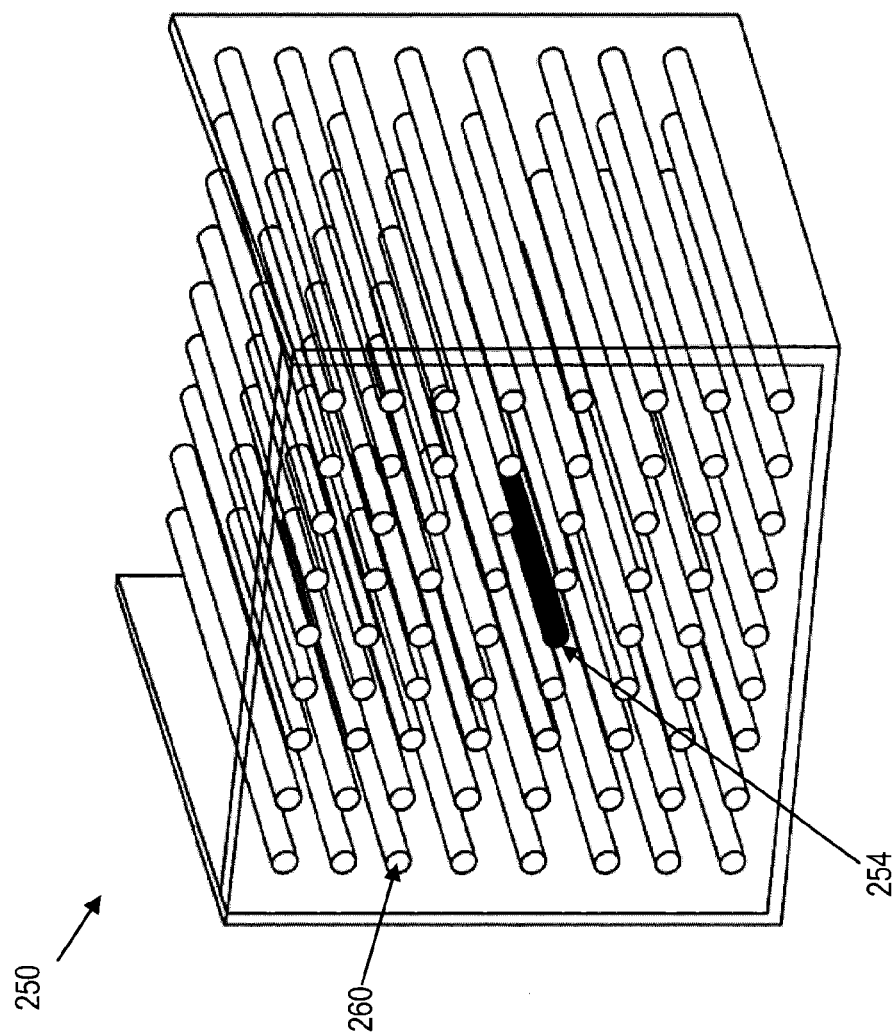

600

| Optimal Traffic Scheme | |
|---|---|
| Street Name | Broad Street |
| Traffic Scheme Boundaries | North: A Street<br>South: G Street |
| Total Lanes | 4 |
| North Lanes | 3 |
| South Lanes | 1 |
| Lane Marker Colors: | North: Red<br>South: Yellow |
| Speed Limit: | North: 25 mph<br>South: 35 mph |
| Implementation Strategy | Steps to implement |

*Fig. 6*

SYSTEM, METHOD, AND APPARATUS FOR PROVIDING ROAD SEPARATION AND TRAFFIC SAFETY

CROSS-REFERENCE TO RELATED APPLICATIONS

The present application claims the benefit of the earlier filing date of U.S. provisional application 62/094,745 having common inventorship with the present application and filed in the U.S. Patent and Trademark Office on Dec. 19, 2014, the entire contents of which being incorporated herein by reference. The present application also claims the benefit of the earlier filing date of U.S. provisional application 62/201,985 having common inventorship with the present application and filed in the U.S. Patent and Trademark Office on Aug. 6, 2015, the entire contents of which being incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Modern cars are advancing in driver safety technology with features that include air bags, lane-centering systems, lane departure warning systems, blind zone detection, and the like. Many of these technologies rely upon lane markers painted on the surface of the road along with cameras and other processing systems.

SUMMARY

In an exemplary embodiment, a system includes a display layer disposed beneath one or more layers of a road that is configured to output light to illuminate an upper surface of the road. One or more vertical cylindrical voids extend from the display layer to the upper surface of the road providing a path for the light from the display layer to reach the upper surface of the road. Circuitry is configured to determine a traffic scheme for the road based on traffic data received from one or more sources. Control signals are issued to the display layer to control illumination of the upper surface of the road in accordance with the traffic scheme. Traffic scheme-specific values are output to a smart vehicle corresponding to one or more smart vehicle algorithms.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is a schematic view of a cubic specimen of plastic optical fiber tendons (POFs) embedded in concrete, according to certain embodiments;

FIG. 6 is an exemplary illustration of an optimal traffic scheme, according to certain embodiments;

DETAILED DESCRIPTION

Figure 1:
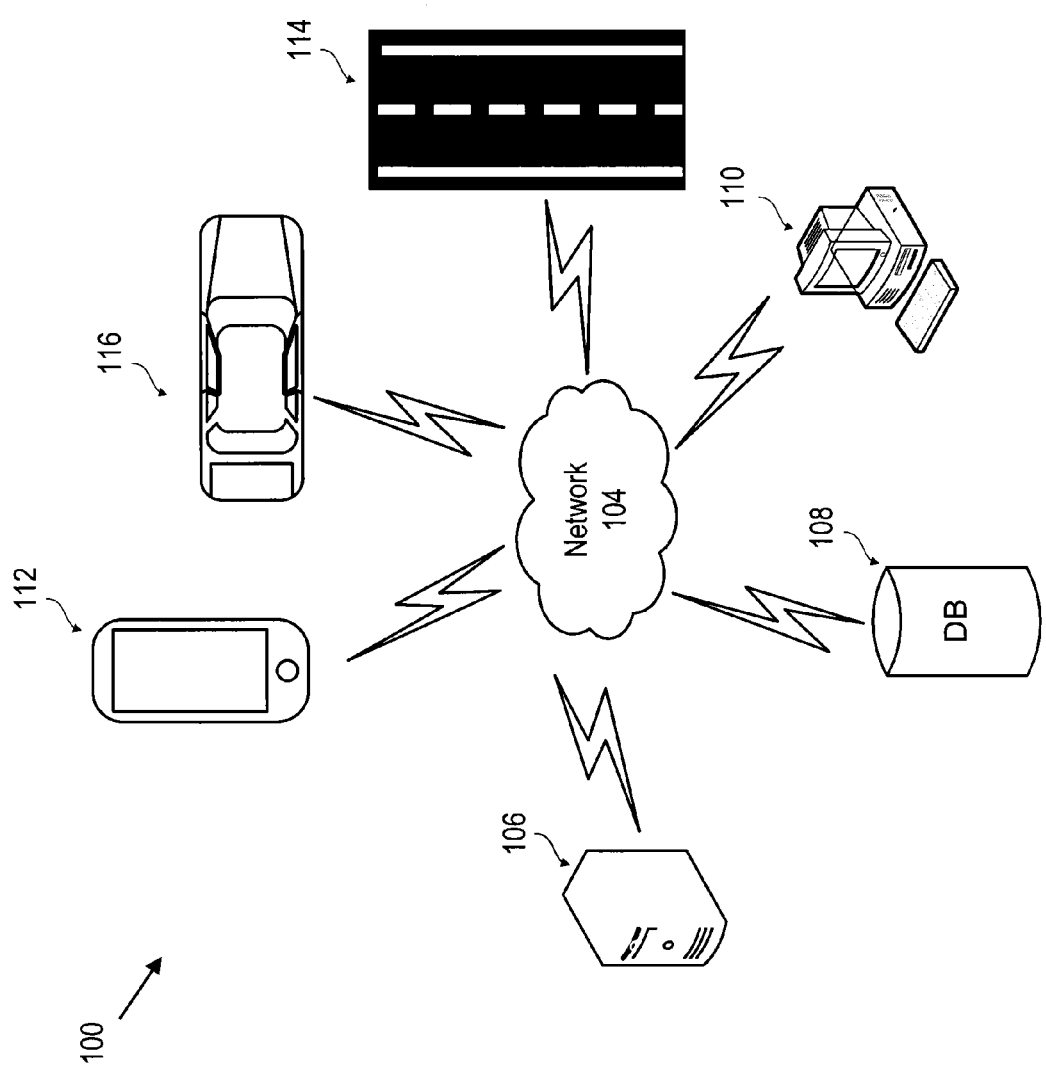
FIG. 1 is an exemplary illustration of a road illumination system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or 5%, and any values therebetween.

Aspects of this disclosure are directed to a system for illuminating upper surfaces of roads to delineate lane marker locations, notify drivers of traffic volume, and provide other information related to driving conditions. In addition, a road illumination system can implement a modified traffic scheme based on traffic incidents that have occurred that may impede the flow of traffic. The road illumination system can also communicate with smart vehicles and can transmit lane detection parameters and other values that may be used by the smart vehicles to implement automatic driving processes and other types of smart vehicle driving aids.

FIG. 1 is an exemplary illustration of a road illumination system 100, according to certain embodiments. The computer 110 represents one or more computers 110 and acts as a client device that is connected to the server 106, the database 108, and the mobile device 112, via the network 104. In some implementations, the computer 110 is used to manually upload traffic data to the server 106. For example, an emergency call control station can identify locations of traffic incidents that have occurred by inputting the locations at the computer 110. In some implementations, the computer 110 can be used to upload and update default traffic schemes for sections of roads to the server 106. In addition, strategies for implementing modified traffic schemes can be updated via an interface at the computer 110.

The server 106 represents one or more servers connected to the computer 110, the database 108, and the mobile device 112 via the network 104. In some implementations, the processing circuitry of the server 106 determines a default traffic scheme for a road, receives traffic data input to the road illumination system 100 at the computer 110 and/or mobile device 112 or via one or more servers that monitor and process traffic data, and determines a modified traffic scheme based on traffic incidents that have occurred. The processing circuitry of the serer 106 also communicates with at least one smart vehicle 116 to transmit one or more parameters for the traffic scheme that correspond to parameters used by the processors in the smart vehicle 116 to perform lane detection, lane centering, driver notifications, and other processes performed by the smart vehicle 116. Details regarding the processes performed by the processing circuitry of the server 106 are discussed further herein.

Note that each of the functions of the described embodiments may be implemented by one or more processing circuits. A processing circuit includes a programmed processor (for example, processor 800 of FIG. 8), as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure.

The road illumination system 100 also includes at least one illuminated road 114 that communicates with the server 106 via network 104. The illuminated road 114 includes a display layer disposed beneath one or more layers of a road structure that outputs colored light, patterns, and images. The illuminated road 114 also includes one or more illumination elements that are vertical cylindrical voids extending from the display layer to the upper surface of the illuminated road 114 and provide a path for the light from the display layer to reach the upper surface of the illuminated road 114. In addition, the illumination elements also include a translucent concrete material that allows the light transmitted from the display layer to be viewed from the surface of the illuminated road. The processing circuitry of the server 106 can communicate with the display layer of the illuminated road 114 via the network 104 to issue control signals to modify the output from the display layer that can be viewed from the upper surface of the illuminated road 114. Details regarding the illuminated road 114 are discussed further herein.

The database 108 represents one or more databases connected to the computer 110, the server 106, and the mobile device 112 via the network 104. In some implementations, default traffic scheme data are saved in the database 108 along with software instructions associated with implementing the traffic schemes on the illuminated road. In addition, the database 108 can historical data related to outcomes of implementing one or more modified traffic schemes. Details regarding the traffic scheme data and steps to implement the traffic schemes are discussed further herein.

The mobile device 112 represents one or more mobile devices connected to the computer 110, the server 106, and the database 108 via the network 104. The network 104 represents one or more networks, such as the Internet, connecting the computer 110, the server 106, the database 108, and the mobile device 112. The network 104 can also communicate via wireless networks such as WI-FI, BLUETOOTH, cellular networks including EDGE, 3G and 4G wireless cellular systems, or any other wireless form of communication that is known.

As would be understood by one of ordinary skill in the art, based on the teachings herein, the mobile device 112 or any other external device could also be used in the same manner as the computer 110 to input video media to the road illumination system 100. In addition, the computer 110 and mobile device 112 can be referred to interchangeably as an external device throughout the disclosure. For example, the mobile device 112 can be used to upload traffic data to the server 106 and/or modify the traffic scheme data that are stored in the database 108.

Figure 2B:
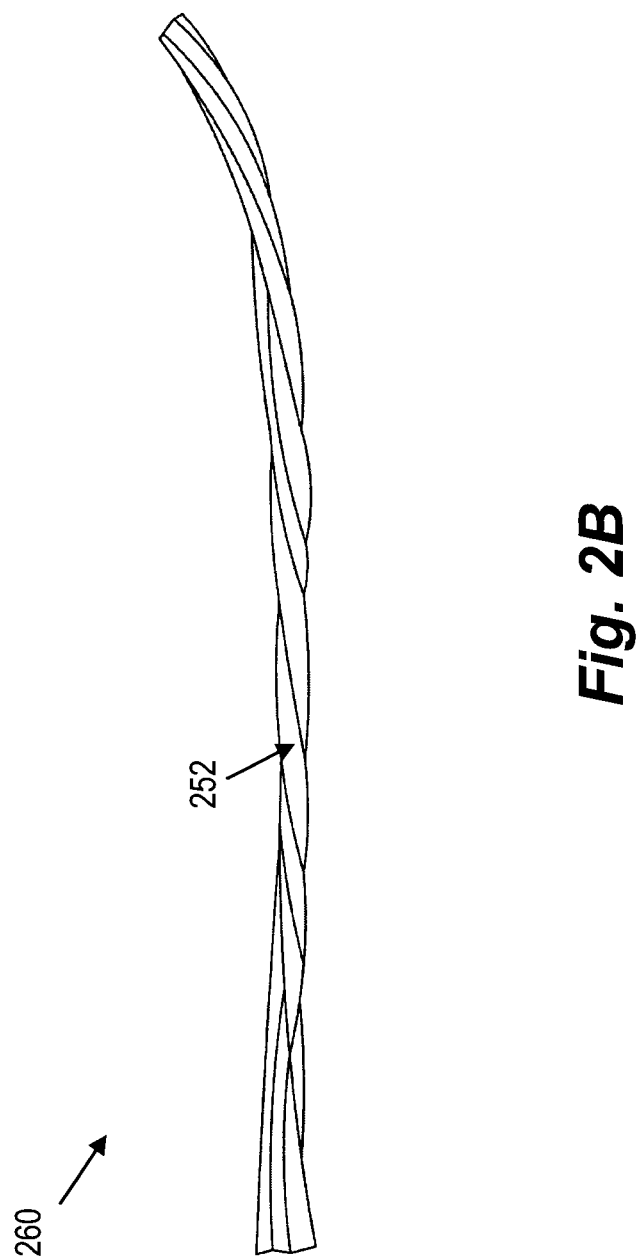
FIG. 2B is an illustration of an exemplary plastic optical fiber tendon, according to certain embodiments.
Figure 2C:
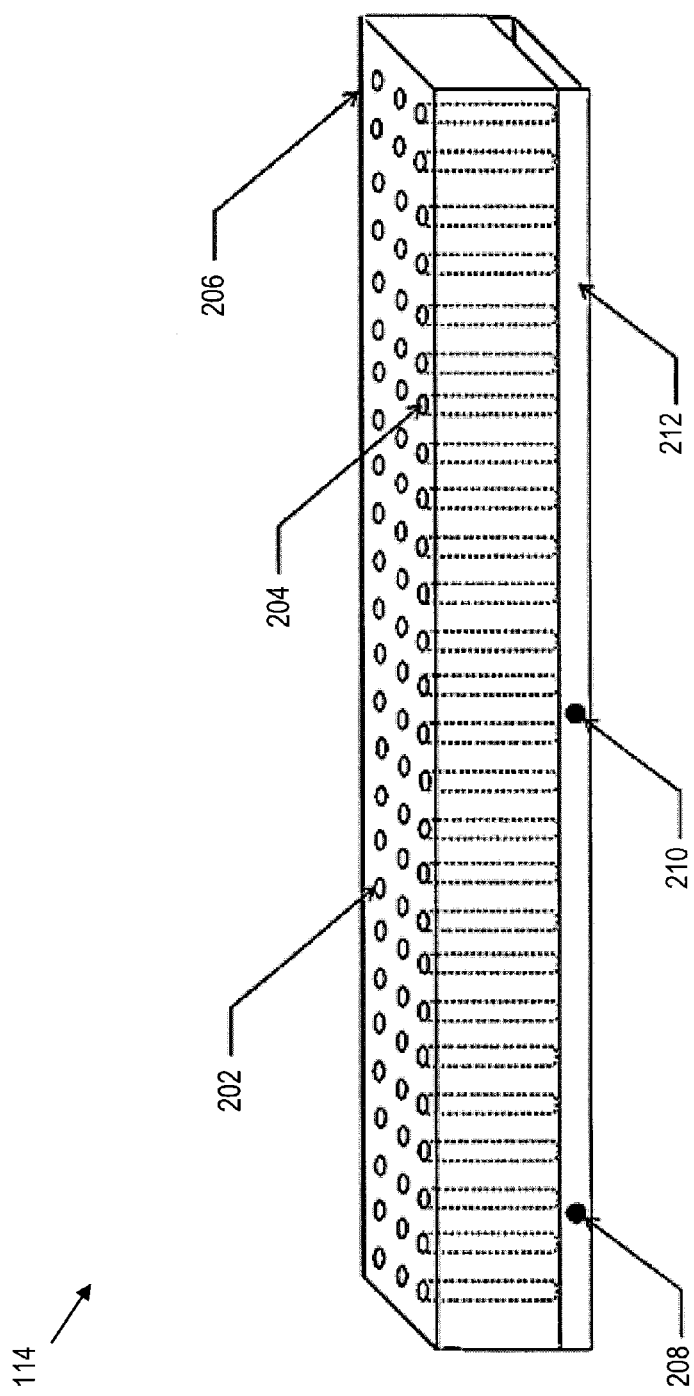
FIG. 2C is an exemplary illustration of an illuminated road, according to certain embodiments.

FIGS. 2A-2C are exemplary illustrations of the structure of the illuminated road 114, according to certain embodiments. As described in F. Alejandro, K. Hanna, and K. Fastag, "Design and manufacture of translucent architectural pre cast panels", Coolest Inventions Tokyo, Time Magazine, Nov. 29, 2004, the entire contents of which are incorporated herein by reference, translucent concrete can be developed by mixing glass powder with concrete to develop a material capable of transmitting light shadows in order to brighten gray concrete. However, mixing the glass powder with the concrete reduces the strength of concrete, thereby confining its application to esthetical purposes. In some implementations, methods associated with the preparation of translucent concrete can include the use of plastic optical fibers (POF) and acrylic cylinders to either increase strength and/or use these embedded materials for structural health monitoring. By using optical fibers embedded in concrete, the loss of strength can be reduced. Furthermore the volume added by the optical fibers into the concrete is proportional to the light transmitting capability of concrete. The bond of the optical fiber with the concrete has been identified as a factor that affects the load carrying capacity and deformational response of the concrete. In addition, the presence of plastic coating on the fiber can affect the bond performance of the concrete and the embedded fibers, as described in F. Ansari, and Y. Libo, "Mechanics of Bond and Interface Shear Transfer in Optical Fiber Sensors", ASCE Journal of Engineering Mechanics, Vol 124, No 4, 1998; F. Ansari, and R. K. Navalurkar, "Kinematics of crack formation in cementations composites by fiber optics", ASCE Journal of Engineering Mechanics, Vol 119, No 5, 1993; J. He, Z. Zhou, and J. Ou, "Study on Smart Transparent Concrete Product and Its Performances", The 6th International Workshop on Advanced Smart Materials andSmart Structures Technology, ANCRiSST2011, Dalian, China, 2011; D. Kalymnios, "Plastic Optical Fibers (POF) in sensing—current status and prospects", 17th International Conference on Optical Fiber Sensors SPIE, Vol. 5855, Bruges, Belgium, 2005; K. Kim, S. Kollar, and S. G. Springer, "A model of embedded fiber optic Fabry-Perot temperature and strain sensors" Journal of Composite Materials, Vol. 27, No. 17, pp. 144-157, 2011; and S. Sumitro, and T. Tsubaki, "Micromechanical fiber pull-out model for fiber reinforce concrete" JSCE Journal of Materials, Construction, Structures and Pavements, Vol. 40, No. 599, pp. 155-163, the entire contents of while are incorporated herein by reference.

FIG. 2A is a schematic view of a cubic specimen 250 of plastic optical fiber (POF) tendons 260 embedded in concrete that can be implemented in the illuminated road 114, according to certain embodiments. The structure of the cubic specimen 250 can be implemented in the illumination elements of the illuminated road 114 or in the concrete structure of the illuminated road 114. Self-compacting concrete can be used to surround the tendons 260 based on an increased workability which may allow the concrete to flow into corners and small areas of the cubic specimen 250. One or more sensors, such as a pressure gauge 254 can be embedded between the tendons 260.

FIG. 2B is an illustration of an exemplary POF tendon 260, according to certain embodiments. One or more POFs 252 are wound into larger diameter POF tendons 260, with each tendon 260 including one or more POFs 252 wound together into a single piece. In one implementation, twelve POFs are wound together to form one tendon 260. In some implementations, the POFs 252 of the tendons 260 are held together via an adhesive mechanism, such as binding tape. The tendons 260 are produced to implement color transfer capabilities of the POFs 252 as well as stress birefringence properties of fibers. These stress birefringence properties transform the tendon 260 into a sensing element that may be capable of measuring an inner stress state of surrounding concrete thereby allowing remote monitoring of the level of stress of inner concrete using data obtained from plastic optical fibers tendons 260.

FIG. 2C is an exemplary illustration of an illuminated road 114, according to certain embodiments. The illuminated road 114 includes at least one layer of pavement that is used to construct a road. The pavement can be made from one or more materials, including asphalt, concrete, brick, gravel, and the like. Properties of the materials used in the pavement of the illuminated road 114 are based on predetermined structural design criteria. For example, in one implementation, one component of the structural design criteria is a structural number (SN), which is a value that expresses an overall structural strength of the pavement. In one implementation, the SN is based on existing soil support, total traffic loads, pavement serviceability, environmental conditions, and the like.

The illuminated road 114 includes a display layer 212 that is disposed beneath the at least one layer of pavement that outputs colored light, patterns, and images. According to certain embodiments, the display layer 212 is positioned below the at least one layer of pavement during construction of the road and receives power from an external power source 210 that is connected to the display layer 212 during road construction. The display layer 212 can include a single display surface, such as a light-emitting diode (LED) display, that covers a predetermined area of the illuminated road 114. In another exemplary embodiment, the display layer 212 includes a plurality of individual display surfaces.

According to certain embodiments, the display layer 212 includes display circuitry that is configured to communicate with the server 106 via the network 104. For example, the display circuitry receives control signals issued by the processing circuitry of the server 106 to output an illumination pattern that corresponds to lane marker locations 206 for a traffic scheme. In addition, the processing circuitry of the server 106 issues control signals to the display circuitry to output a particular color of light for the illumination patterns based on the traffic density within a predetermined area. For example, the display layer 212 outputs green light at the lane marker locations when the traffic density is lower than a predetermined threshold and red light at the lane marker locations when the traffic density is greater than a predetermined threshold. In some implementations, the processing circuitry of the server 106 traffic density based on received traffic reports and/or a difference between a speed limit for the illuminated road 114 and an average actual speed of vehicles traveling on the illuminated road 114. The display layer 212 also outputs images onto the upper surface of the illuminated road 114, The illuminated road 114 also includes one or more illumination elements 204, which are vertical cylindrical voids extending from the display layer 212 to the upper surface of the illuminated road 114. According to certain embodiments, the illumination elements 204 are filled with a translucent material that that allows light to pass from the display layer 212 to the upper surface of the illuminated road 114. The translucent material may include a mesh-like material, such as a fiber mesh, that allows light to pass while still maintaining the structural design criteria of the illuminated road 114. In addition, the illumination elements 204 can include the POFs that transmit light to the upper surface of the illuminated road 114 from the display layer 212. The shape of the illumination elements 204 may be circular, oval, square, rectangular, or any other shape that allows light to pass through the illumination elements 204.

The illumination elements 204 are formed into the structure of the illuminated road 114 when the pavement materials for the illuminated road 114 are initially poured. Illumination element preforms 202 can be arranged at predetermined locations prior to the pavement materials being poured during road construction, and the pavement materials are then poured around the illumination element preforms 202 to form the cylindrical voids of the illumination elements 204. The illumination element preforms 202 can be made of plastic, metal, steel, or any other materials that contribute to the structural strength of the illuminated road 114 so that the SN or other structural design criteria of the illuminated road 114 is maintained. The translucent material and/or optical fibers can then added within the boundaries of the illumination element preforms 202.

According to certain embodiments, a size or diameter of the illumination elements 204 is based on the structural design criteria of the illuminated road 114 as well as the properties of the transmitted light from the display layer 212. For example, increasing the diameter of the illumination elements 204 may cause the SN of the illuminated road 114 to decrease. In addition, the distribution density of the illumination elements 204 across the illuminated road 114 is based on the structural design criteria of the road. For example, increasing the distribution density of the illumination elements 204 may result in a decrease in the SN of the illuminated road 114. In one implementation, the individual display surfaces of the display layer 212 are positioned at locations that correspond to locations of one or more illumination elements 204.

In addition, the illuminated road 114 can include one or more sensors 208 that acquire sensor data related to environment, structural properties of the illuminated road 114 performance of the display layer 212. For example, the illuminated road can include pressure sensors that measure an amount of stress on the illuminated road 114 from traffic volume, the environment, and the like. In addition, the one or more sensors 208 can include road temperature sensors, sensors that detect electrical failures of the display layer 212, and other types of sensors.

In addition, the surface of the illumination elements 204 of the illuminated road 114 can be covered with a heat resistant polymer which protects the illuminated road 114 from deterioration during pouring of asphalt. Upon cooling of the asphalt, the polymer layer can be removed to expose a working surface of the illuminated road 114. Similar methodologies can be adopted for implementation of the illumination elements 204 on rigid pavements and during upgrade of existing infrastructures. The bond between the illumination elements 204 and surrounding road materials will be maintained using shear connectors to increase frictional bonding and adhesives to bind the two components. Similar methodologies can be used to implement illuminated road 114 on airport aprons, railway stations and ports where rigid pavement construction may be preferred.

In one implementation, when a lane is idle without an amount of sustained loading that is less than a predetermined threshold, the color of the lane markers of the illuminated road 114 is white to inform road users that conditions of the illuminated road 114 are normal, which may mean that no traffic obstructions are present. A sustained pressure measured by the pressure sensors within the illuminated road 114 greater than a predetermined threshold may indicate that a traffic incident and/or obstruction has occurred, such as a traffic accident, sand pile, snow, and/or animal crossing. When the increased pressure is detected, processing circuitry of the server 106 issues a control signal to change the color output by the display layer 212 to red within a first predetermined range from the traffic incident, such as 25 meters (m). The color of the lane markers 206 of the illuminated road 114 within a second predetermined range, such as between 25 m-50 m of the incident, can change to yellow to warn the on-coming traffic of the existence of the traffic incident ahead. The color of the lane markers 206 of the illuminated road 114 within a third predetermined range, such as greater than 50 m from the incident, are green. In some implementations, a time period for triggering the colors of the lane markers 206 to change based on the increased pressure is based on utility and/or traffic density of the road. For example, for a highway with a speed limit of 120 km/hr, the sustained pressure timer is triggered at 3 seconds while at roads with 20 km/hr speed limit may have the trigger set at 10 seconds.

Figure 2D:
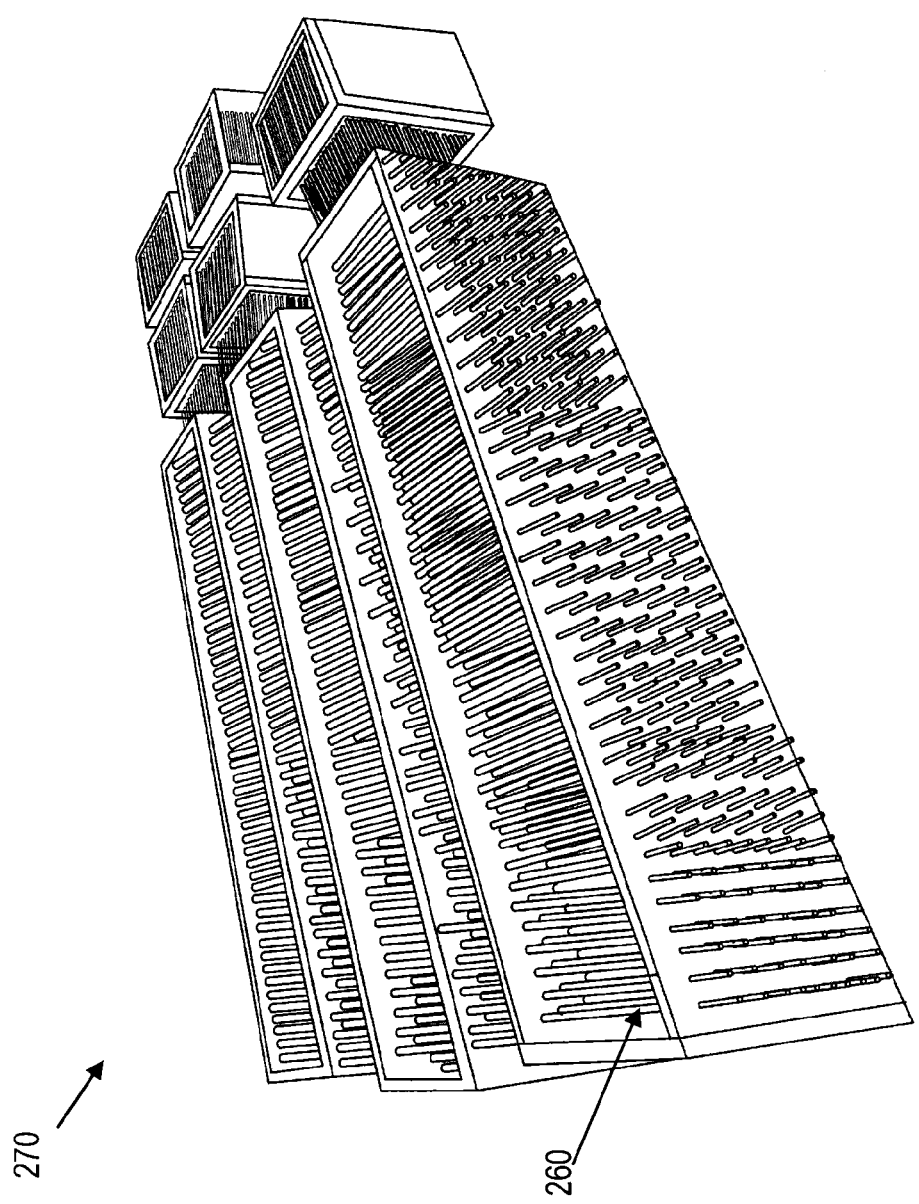
FIG. 2D is an exemplary illustration of mold preparation for the illuminated road, according to certain embodiments.

FIG. 2D is an exemplary illustration of a mold 270 for testing of the concrete structure used for the illuminated road 114, according to certain embodiments. The mold 270 includes one or more beam mold specimens and one or cube mold specimens that represent the illumination elements 204 of the illuminated road 114. The POF tendons 260 are installed within pre-drilled holes of a concrete mold 270 secured in place by an adhesive material, and the concrete is poured into the mold. In some implementations ASTM C150 Ordinary Portland Cement, Type I is used as a binding material having the chemical composition by percentage weight) as follows: CaO=64.3, $SiO_2$=22, $Al_2O_3$=5.64, $Fe_2O_3$=3.8, $K_2O$=0.36, MgO=2.11, $Na_2O$=0.19, Equivalent alkalis ($Na_2O$+0.658$K_2O$)=0.42, loss on ignition=0.7, $C_3S$=55, $C_2S$=19, $C_3A$=10 and $C_4AF$=7, as described by ASTM C150/C150M-12, "Standard Specification for Portland Cement", ASTM International, West Conshohocken, Pa., 2012. www.astm.org, the entire contents of which are incorporated herein by reference.

Dune sand is used as fine aggregate, which acts as a filler, having bulk specific gravity and absorption of 2.62 and 0.62%, respectively. Crushed limestone is used as coarse aggregate with a maximum size of 9.5 mm, which provides strength and economy in construction, having bulk specific gravity and absorption of 2.60 and 1.08%, respectively. Further, coarse aggregate grading requirement was fulfilled as per ASTM C33 by selecting sieve Size Number 56 and aggregate size of 19 and 9.5 mm proportioned to 85 and 15% by mass, respectively, as described in ASTM C33/C33M-13, "Standard Specification for Concrete Aggregates", ASTM International, West Conshohocken, Pa., 2013. www.astm.org, the entire contents of which are incorporated herein by reference. Polycarboxiate ether based superplasticizer is added to the mix as 0.5% by volume of cement in-order to give the mix a desired level workability. The mix constituent includes OPC, fine aggregate, and medium aggregate of 1, 1.7 and 2, respectively. The cement content is 370 kg/m³ and water to cement ratio is 0.4. In addition, an optimum dosage of superplasticizer is determined which complies with ASTM C494 Type F, in order to achieve the desired workability, flow-ability and resistance to segregation, as described in ASTM C494/C494M-13, "Standard Specification for Chemical Admixtures for Concrete", ASTM International, West Conshohocken, Pa., 2013. www.astm.org, the entire contents of which are incorporated herein by reference.

Mixes are cast by mixing the concrete ingredients in an electrical drum-type concrete mixture. Dry materials including cement and the coarse and fine aggregates are mixed first for two minutes and then the raw material is thoroughly mixed by adding water along with 50% of superplasticizer for thirty seconds. The remaining 50% of superplasticizer is added thirty seconds after the fast mixing of the first batch. The concrete is placed into the mold specimens 270 in three equal layers and vibrated on mechanical table for five seconds. Casting is completed upon preparation of the mold 270. The concrete surface is leveled with the help of steel blade trowel and specimens are demolded after 24 hours and submerged in water curing tank for the period of 28 days. Table 1 provides the details of the mold specimens cast.

TABLE 1

| Specimen | Number | Size (mm) |
|---|---|---|
| Beam | 3 | 1000 × 150 × 150 |
| Cubes | 6 | 150 × 150 × 150 |

Three beam specimens representing the illumination elements 204 of the illuminated road 114 are cast for testing under flexure, skid resistance and compression testing, while six cube specimens were cast for light passing test, compression and temperature testing. The details of the tests are described further herein. By embedding glass fibers into the concrete, it may possible to determine an internal stress state of the embedded material. For example, the POF tendons 260 acts as a photoelastic material which is isotropic under unloaded conditions, but upon the application of loading, the POFs 252 become anisotropic materials, which is a result of the light birefringence phenomenon. By knowing an optical constant of isochromatics and isoclinics along with the thickness of the POFs, the internal stress condition of the surrounding material can be estimated. This remote monitoring property of the POFs 252 can be used to estimate a remaining design life of the illuminated road 114.

According to certain embodiments, the addition of POF in concrete results in loss of strength, as described in F. Basma, M. Roaa, F. Doaa, and A. Mamoun, "Basics of Light Transmitting Concrete", Global Advanced Research Journal of Engineering, Technology and Innovation, Vol. 2, No. 3, pp. 076-083, March, 2013; A. Shakir, H. Hassan, and A. Safaa, "Effect of Plastic Optical Fiber on Some Properties of Translucent Concrete", Engineering and Technology Journal, Vol. 32, No. 12, Part A, pp. 2846-2861, 2014; and A. Sawant, R, Jugdar, and A Sawant, "Light Transmitting Concrete by using Optical Fiber", International Journal of Inventive Engineering and Sciences, ISSN: 2319-9598, Vol. 3, Issue-1, pp. 23-28, 2014, the entire contents of which are incorporated herein by reference.

In some implementations, the strength loss can be reduced by utilizing a predetermined percentage replacement so that the benefits of light transmission can be achieved at the lowest loss of strength. In this regard, samples for compressive strength testing may be prepared by replacing the 3% volume ratio of volume of fibers to that of concrete. A compression testing machine may be used to determine the compressive strength of mold specimens with and without POF tendons. Both samples may be tested under compressive loading and percentage reduction in load carrying capacity is calculated to identify the strength loss owing to the addition of tendons. Loading is applied parallel to the POF tendons 260 in-order to simulate a real world application condition.

Table 2 represents details of compressive strength testing of cubic specimens with and without POF tendons. The percentage reduction in compressive strength carrying capacity is calculated owing to the inclusion of POF tendons in the concrete, and a determination is made that there is 11.14% reduction in strength which is lower than that reported in the conventional implementations, which estimate the strength reduction to be approximately 35%. This gain in concrete strength can be attributed to an increased bond between the POF tendons 206 and the surrounding concrete. The loss in compressive strength is due to water film ingress at the interface of the tendon 260 and surrounding concrete, which reduces the bond between concrete and tendon thereby resulting in lower strength. However, by roughing the surface of the POF tendon 260, the bond can be improved which leads to the increase in compressive strength. In some implementations, cracking may be observed along the POF tendons 260 indicating the shear bond failure between the tendon and the surrounding concrete.

TABLE 2

| Size (mm) | Curing (Days) | Compressive Stress (KN) | Sress (MPa) | Flow test (mm) |
|---|---|---|---|---|
| Without POF Tendons | | | | |
| 150 × 150 × 150 | 28 | 858.92 | 36.98 | 650-680 |
| 150 × 150 × 150 | 28 | 847.68 | 36.50 | 650-680 |
| 150 × 150 × 150 | 28 | 851.31 | 36.65 | 650-680 |
| Average Strength | | 852.64 | | |
| With POF Tendons | | | | |
| 150 × 150 × 150 | 28 | 727.90 | 31.34 | 650-680 |
| 150 × 150 × 150 | 28 | 810.87 | 34.91 | 650-680 |
| 150 × 150 × 150 | 28 | 734.01 | 31.60 | 650-680 |
| Average Strength | | 757.59 | | |

A light transmissibility test is performed using LUX meter TECPEL 530. The objective of this test is to calculate a percentage of light passing through the POF tendon 260. In some implementations, the proportion of light passing through the tendon 260 can have an impact on performance of illuminated road 114 during the day light. In some implementations, the POF tendons 206 are designed so that the color of light is visible to road users during day time. The test is performed in sunlight in order to simulate real world conditions, and the light reading was measured by the LUX meter. The translucent concrete sample was placed between a neon light source and the LUX meter. The probe of the LUX meter was placed on the fiber such that the light intensity at the fiber can be measured. One or more light filters were used, namely red, blue, and green light filters, to measure colored light transmissibility. The cube specimen is removed from the assembly and the readings are taken at an equal distance from the neon lamp, and both of the values are compared and percentage intensity of light passing through the translucent concrete is calculated. The light transmissibility test can also be performed in a dark room to determine the light intensity of the POF tendons 260 and the translucent concrete at night. The light transmissibility is calculated by the following equation:

$$p = \frac{J_1}{J_0} \times 100\%,$$

where $J_1$ represents light passing through the sample, $J_0$ represents light incident on the LUX meter probe, and light passing directly corresponds to a measurement of 180 LUX. For the cubic mold specimen with the embedded POF tendons 260 described herein, $$\text{the percentage light passing through} = \frac{21}{180} \times 100\% = 11.7\%.$$

In addition, temperature testing of the mold specimens can be performed to determine a melting point of optical fibers and their performance under temperature variations. In one implementation, the cube mold specimens are tested at 225° C. for 1 hour since the melting temperature of asphalt is between 160-180° C., according to one implementation, and the testing temperature was selected to correspond to an extreme case of mid-day pouring of asphalt. The mold specimen is tested in surface dry condition in electric oven, and the POFs 252 did not melt after being exposed to 225° C. temperature for the one hour. Since the operational temperature of the road is between 60-80° C., the test mold specimen may suitable for implementations of the illuminated road 114.

A skid resistance test can be conducted in both saturated surface condition and air dry condition in order to ascertain the performance of the illuminated road 114 under traffic loading conditions. In one implementation, a standard specification of Skid Resistance Value (SRV) is 55. Table 3 shows testing values for two beams molds under wet and dry conditions which show that an average SRV under wet condition is 49, and the average SRV under dry condition is 65. In addition, the SRV under wet condition can be improved by roughing the surface of the illuminated road 114, which can be achieved under working conditions.

TABLE 3

| Size (mm) | Test Location | Skid Avg. | Surface Condition |
|---|---|---|---|
| Beam 1 | Left | | Wet |
| 1000 × 150 × 150 | Mid | | Wet |
| | Right | | Wet |
| | Left | | Dry |
| | Mid | | Dry |
| | Right | | Dry |
| | Left | | Wet |
| | Mid | | Wet |
| Beam 2 | Right | | Wet |
| 1000 × 150 × 150 | Left | | Dry |
| | Mid | | Dry |
| | Right | | Dry |

In addition, flexure strength testing of the beam molds can be performed to investigate the response of the beam members under flexural loading. However, in real world conditions the beam mold may be embedded in the illuminated road 114 and has continuous support from the ground beneath. Hence the moment distribution would be smooth, and the main cause of failure is due to shear loading. However the purpose of testing the beam under flexure is to determine a worst case scenario where the surface, such as asphalt, below the illuminated road 114 becomes hollow because of water ingress due to excessive rainfall, flooding, and the like. The flexure strength testing results show that an average flexure strength was 9.1 KN, which represents a worst case implementation.

Figure 3:
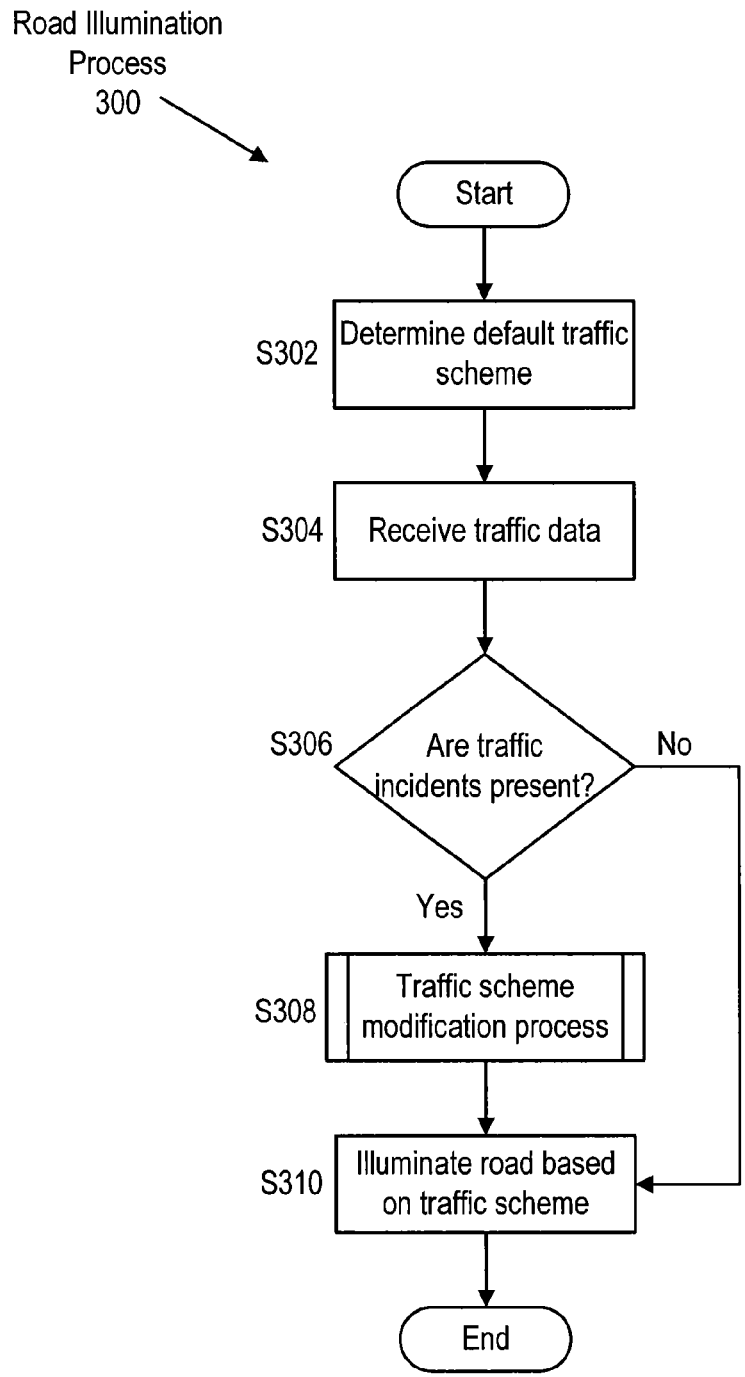
FIG. 3 is an exemplary flowchart of a road illumination process, according to certain embodiments.

FIG. 3 is an exemplary flowchart of a road illumination process 300, according to certain embodiments. In the road illumination process 300, the processing circuitry of the server 106 uses traffic data to determine an optimal traffic scheme to be output on the upper surface of the illuminated road 114. For example, based on the traffic data, the processing circuitry can determine the color and/or locations of the lane marker patterns output by the display layer 212 onto the upper surface of the illuminated road 114 via the one or more illumination elements 204. The processing circuitry can also modify the number of lanes assigned to a direction of traffic flow based on the traffic data. The processing circuitry of the server 106 can then output control signals to the display layer 212 to modify the patterns that are output by the display layer 212 to correspond to the optimal traffic scheme.

At step S302, the processing circuitry of the server 106 determines a default traffic scheme. In some implementations, default traffic schemes for one or more sections of the illuminated road 114 are stored in the database 108 and are updated via the computer 110 and/or mobile device 112 in response to long-term changes that are made to the traffic scheme. For example, if road construction is performed, lanes are added and/or subtracted, or traffic light configurations are modified, the default traffic schemes can be updated to reflect the changes. According to certain embodiments, the default traffic schemes are associated with one or more factors, such as a time of day. For example, in a downtown metropolitan city with a high traffic density during rush hour, the roads in the downtown area may have a "peak hours" default traffic scheme that is implemented when the traffic density is highest, such as during the morning and evening rush hours. In one implementation, the "peak hours" default traffic scheme assigns one or more roads to be one-way streets that are assigned as two-way streets during non-rush hours. In addition, the processing circuitry of the server 106 can determine one or more parameters of the default traffic scheme 106 based on learned patterns from traffic planning and engineering algorithms.

Figure 4:
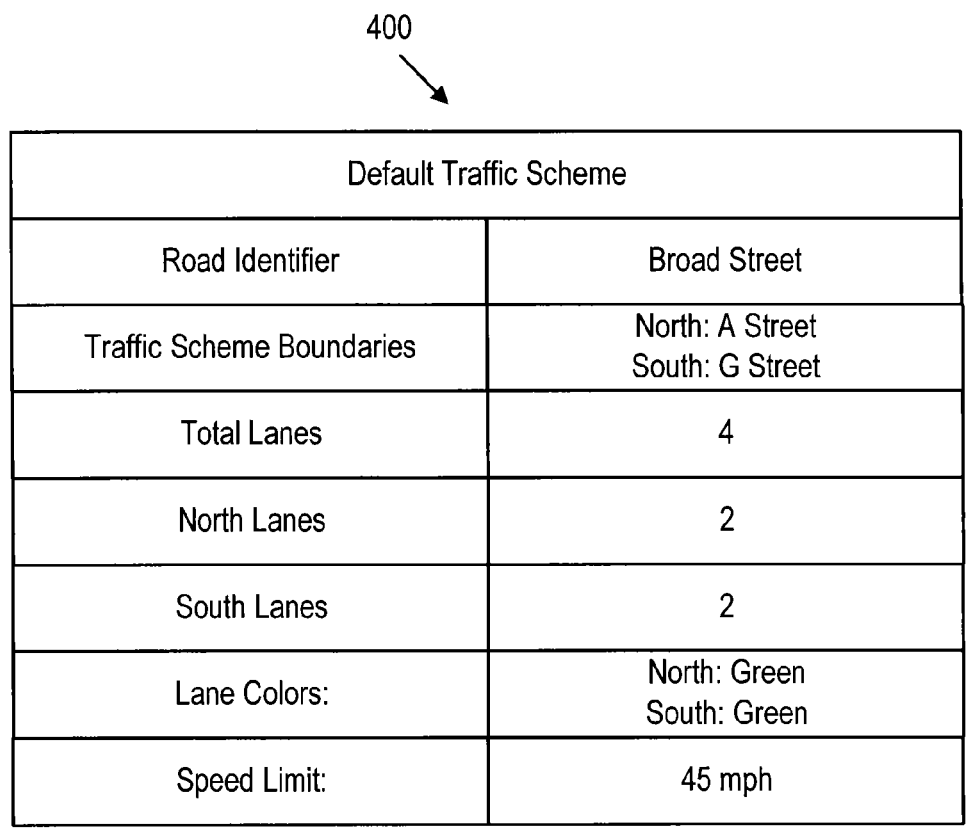
FIG. 4 is an exemplary illustration of a default traffic scheme, according to certain embodiments.

FIG. 4 is an exemplary illustration of a default traffic scheme 400, according to certain embodiments. The default traffic scheme 400 includes at least one component that identifies the location of the illuminated road 114, lane marker configuration, lane marker colors, other images that may be displayed on the illuminated road 114, and the like. For example, the default traffic scheme 400 includes a road identifier of "Broad Street," which may be a road that extends in a north-south direction. The default traffic scheme 400 also includes traffic scheme boundaries that delineate where the default traffic scheme 400 is in effect on the identified road. With respect to the default traffic scheme 400 for Broad Street, the traffic scheme boundaries include a north boundary of "A Street" and a South Boundary of "G Street." In some implementations, the traffic scheme boundaries include other types of location identifications, such as a latitude/longitude point, a highway exit, municipality boundaries, and the like.

The default traffic scheme 400 also identifies a total number of lanes, a direction of traffic flow for the one or more lanes, lane marker colors for the one or more lanes, and a speed limit for the illuminated road 114 associated with the default traffic scheme 400. For example, the section of Broad Street from A Street to G Street has a total of four lanes with two lanes allocated to traffic moving in a north direction and two lanes allocated to traffic moving in a south direction. In one implementation, the processing circuitry determines which lanes are associated with each direction of travel based on standard driving rules for where the illuminated road 114 is located. For example, if driving rules for the United States are in effect, then the directions of traffic flow for the one or more lanes are based on cars driving on the right-side of the road. When facing north, the two rightmost lanes of Broad Street are assigned to traffic flowing in the north direction, and then two leftmost lanes of Broad Street are assigned to traffic flowing in the south direction. In another implementation, the processing circuitry of the server 106 assigns unique identification codes to each lane of the illuminated road 114 and assigns directions of traffic flow and lane marker colors to the lanes based on the identification codes of the lanes. According to certain embodiments, lanes associated with each direction of traffic flow are separated by a set of solid, double lines. The location of the solid, double lines can also be indicated by the default traffic scheme.

The default traffic scheme 400 also includes lane marker color assignments for each of the lanes of the illuminated road 114. In one implementation, the lane colors indicated in the default traffic scheme 400 are based on an average traffic density on the illuminated road 114. For the default traffic scheme 400, the lane marker colors for the north flowing lanes and the south flowing lanes are assigned a lane marker color of green, which may indicate that an average traffic density on the illuminated road 114. In one implementation, a high traffic density can be indicated by a lane marker color of red. The processing circuitry of the server 106 determines the traffic density based on learned patterns from transportation planning and engineering algorithms.

In addition, the processing circuitry assigns one or more traffic density levels based on one or more predetermined traffic density thresholds associated with the predetermined levels. For example, the traffic density can be measured in number of vehicles per distance, such as mile, kilometer, or any other distance measurement. In one implementation, the processing circuitry of the server 106 determines the lane marker colors output by the display layer 212 of the illuminated road 114 for one or more times of the day, week, season, year, and the like. For example, the lane marker colors for Broad Street may be red at 4:00 PM on a Wednesday when the traffic density is at a highest level during rush hour. However, the lane marker colors for Broad Street may be green at 4:00 PM on a Sunday when the average traffic Density on Broad Street may be lower. In an alternate implementation, the default traffic scheme 400 may not use color to indicate the traffic density, and the lane marker color output on the upper surface of the illuminated road 114 may be white.

Referring back to FIG. 3, at step S304, the processing circuitry of the server 106 receives traffic data from one or more sources. In some implementations, the computer 110 is used to manually upload the traffic data to the server 106. For example, an emergency call control station can identify locations of traffic incidents that have occurred by inputting the locations at the computer 110. In addition, the processing circuitry of the server 106 can also receive traffic incident reports, current driving speeds, and other traffic conditions from one or more drivers via the at least one mobile device 112. In some implementations where traffic cameras are installed on the illuminated road 114, the processing circuitry can receive a streaming video feed of the traffic on the illuminated road 114 and can use one or more image processing algorithms to determine the traffic density, average vehicle speed, and the like.

At step S306, the processing circuitry of the server 106 determines whether one or more traffic incidents are present on the illuminated road 114 and/or within a predetermined incident distance of the illuminated road 114. According to some embodiments, the processing circuitry determines that a traffic incident is present based on the traffic data received at step S302. For example, a traffic accident, stalled vehicle, road construction, and/or unexpected lane reductions can be classified as traffic incidents. In addition, the processing circuitry can determine that a traffic incident has occurred if the difference between the speed limit for the illuminated road 114 and an average speed for the vehicles traveling on the illuminated road 114 is greater than a predetermined threshold. If the processing circuitry of the server 106 determines that one or more traffic incidents are present, resulting in a "yes," then step S308 is performed. Otherwise, if no traffic incidents are present, resulting in a "no" at step S306, then step S310 is performed.

At step S308, if it is determined at step S306 that one or more traffic incidents are present, then a traffic scheme modification process is performed. The processing circuitry of the server 106 can determine at least one optimal traffic scheme for the illuminated road 114 that reduces an impact of the one or more traffic incidents. For example, the processing circuitry can modify the direction of traffic flow for the one or more lanes, the color of the lane markers, and/or the speed limit on the illuminated road 114. Details regarding the traffic scheme modification process are discussed further herein.

At step S310, the processing circuitry outputs control signals to the display layer 212 to implement the traffic scheme on the illuminated road 114. Based on the capabilities of the display layer 212, the processing circuitry of the server 106 can issue control signals to the display layer 212 to output the lane marker locations, the lane marker colors, and/or the speed limit for the illuminated road 114. As will be discussed further herein, when an optimal traffic scheme is implemented due to the presence of one or more traffic incidents, then the traffic scheme is output by the display layer 212 in accordance with one or more implementation steps associated with the optimal traffic scheme. According to certain embodiments, the processing circuitry can issue control signals to the display layer 212 to output one or more images corresponding to advertisements, brands, or other types of notifications. For example, advertisements for retail shops can be output onto the illuminated road 114 to direct drivers to the locations of the shops.

Figure 5:
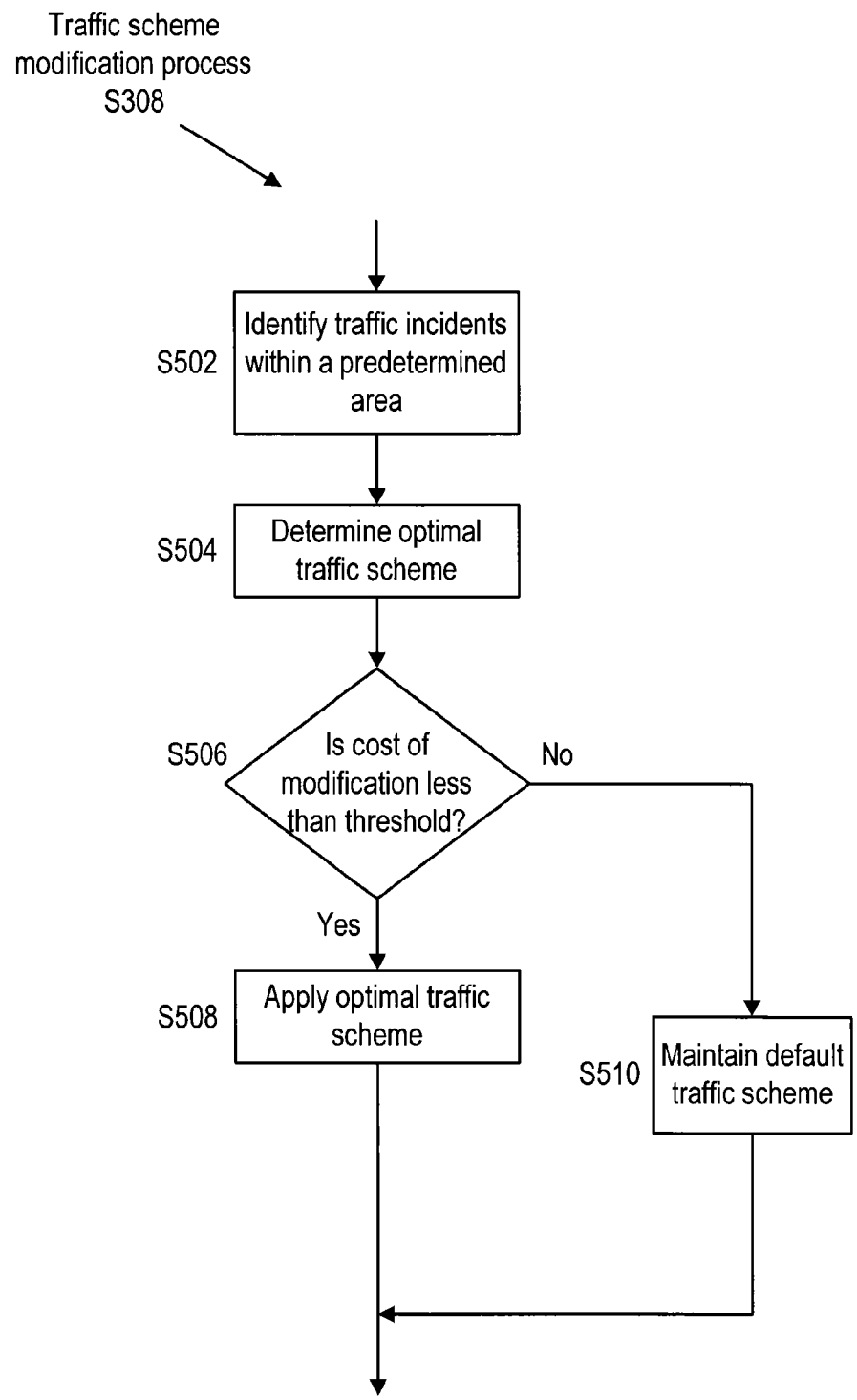
FIG. 5 is an exemplary flowchart of a traffic scheme modification process, according to certain embodiments.

FIG. 5 is an exemplary flowchart of a traffic scheme modification process of step S308, according to certain embodiments. At step S502, the processing circuitry identifies one or more traffic incidents present on the illuminated road 114 and/or within a predetermined modification distance from the illuminated road 114. In some implementations, the predetermined modification distance equals the predetermined incident distance for determining traffic incidents at step S306 of the road illumination process 300. However, in other implementations, the predetermined modification distance is greater than or less than the predetermined incident distance. For example, the predetermined modification distance may be five miles, and the predetermined incident distance used at step S306 may be three miles. The predetermined modification distance corresponds to area over which the processing circuitry determines an optimal traffic scheme.

At step S504, the processing circuitry determines an optimal traffic scheme based on the traffic incidents within the predetermined modification distance from the illuminated road 114. Throughout the disclosure, the optimal traffic scheme can be referred to interchangeably as a modified traffic scheme. According to certain embodiments, the optimal traffic scheme reduces the impact of the traffic incidents for vehicles driving on the illuminated road 114. For example, the processing circuitry of the server 106 can modify the number of lanes associated with the at least one direction of traffic flow, the lane marker colors output by the display layer 212 of the illuminated road 114, the speed limits for the directions of traffic flow, and the other types of images output to the upper surface of the illuminated road 114.

FIG. 6 is an exemplary illustration of an optimal traffic scheme 600, according to certain embodiments. As discussed previously with respect to the default traffic scheme 500, the optimal traffic scheme 600 includes at least one component that identifies the location of the illuminated road 114, lane marker configuration, lane marker colors, other images that may be displayed on the illuminated road 114, and the like. For example, the optimal traffic scheme 600 also covers the illuminated road 114 on Broad Street from a North boundary of A Street to a South boundary of G Street and has a total of four lanes.

In one example, a traffic incident has occurred within the predetermined modification distance in one of the North-traveling lanes of Broad Street, which results in a reduction in vehicle speed by over fifteen miles per hour (mph). The processing circuitry of the server 106 determines that the optimal traffic scheme 600 includes increasing the number of lanes traveling north to three and reducing the number of lanes traveling south to one to alleviate the traffic backup resulting from the traffic incident. In addition, the processing circuitry of the server 106 may modify the lane marker color and/or speed limit based on the traffic data associated with the traffic incident. For example, the color of the North-traveling lanes may be changed to red to indicate a high traffic density that is greater than a high density threshold, and the color of the South-traveling lanes may be changed to yellow to indicate a moderate traffic density that is less than the high density threshold but greater than a lower density threshold.

Also, the speed limit of the North-traveling lanes is reduced to 25 mph, and the speed limit of the South-traveling lanes is reduced to 35 mph. In some implementations, the modified speed limit is output to one or more LED speed limit signs that are displayed on a shoulder and/or median of a road. In other embodiments, the modified speed limit is displayed on the upper surface of the illuminated road 114.

The optimal traffic scheme 600 also includes one or more implementation steps associated with implementing the optimal traffic scheme 600. For example, simultaneously modifying all of the lane markers on the illuminated road 114 to implement the optimal traffic scheme 600 may result in confusion among the drivers on the illuminated road. Instead, the implementation steps may include outputting a traffic scheme modification warning on the upper surface of the illuminated road 114 and/or on other roadside signs or billboards for a predetermined time period before the optimal traffic scheme 600 is implemented. In addition, the implementation steps can include reducing the South-traveling lanes to one prior to increasing the North-traveling lanes to three by adding a second set of solid, double lines to reduce the South-traveling lanes to one before removing the solid, double lines associated with the default traffic scheme 400. Also, the lane marker modifications can be made while one or more Broad Street traffic lights at A Street and/or G Street are red and traffic is stopped.

Referring back to FIG. 5, at step S506, the processing circuitry determines whether a cost of modifying the default traffic scheme 400 is less than a predetermined threshold. According to one implementation, the cost of modifying the default traffic scheme 400 is based on changes in overall traffic density and/or average vehicle speed within the predetermined modification distance from the illuminated road 114 based on the implementation of the optimal traffic scheme 600. For example, the predetermined cost threshold can be set to 10 mph, which means that the optimal traffic scheme 600 is implemented if the reduction in vehicle speed on the roads within the predetermined modification distance is less than 10 mph. If the cost of modifying the default traffic scheme is less than a predetermined threshold, resulting in a "yes" at step S506, then step S508 is performed. Otherwise, if the cost of modifying the default traffic scheme is greater or equal to the predetermined threshold, resulting in a "no" at step S506, then step S510 is performed.

At step S508, if the cost of implementing the optimal traffic scheme 600 from the default traffic scheme 400 is less than the predetermined threshold, then the processing circuitry of the server 106 assigns the optimal traffic scheme 600 to be the current traffic scheme for the illuminated road 114. At step S512, if the cost of modifying the default traffic scheme 400 is greater than or equal to the predetermined threshold, then the processing circuitry maintains the default traffic scheme 400 as the current traffic scheme.

Figure 7:
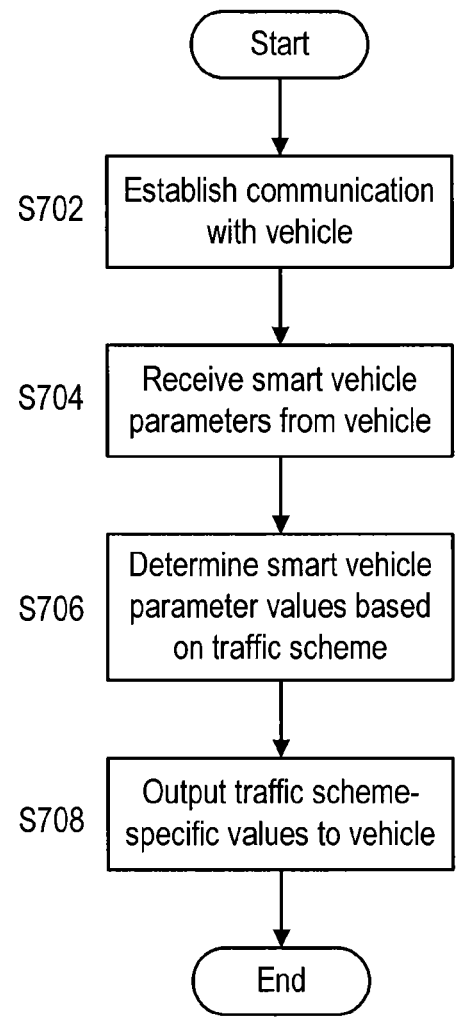
FIG. 7 is an exemplary flowchart of a vehicle integration process, according to certain embodiments.

FIG. 7 is an exemplary flowchart of a vehicle integration process 700, according to certain embodiments. Smart vehicles are equipped with circuitry that provides additional capabilities, such as automatic steering, driver distraction notifications, and other types of driving aids and notifications. As the traffic schemes for the illuminated road 114 are modified to mitigate the effects of traffic incidents, the processing circuitry of the server 106 can communicate the traffic scheme modifications to the at least one smart vehicle 116. The vehicle integration process 700 is continuously performed by the processing circuitry while the at least one smart vehicle 116 is in communication with the road illumination system 100.

At step S702, the at least one smart vehicle 116 connects to the road illumination system 100 via the network 104. For example, the smart vehicle 116 has at least one electronic control unit (ECU) that includes wireless communication circuitry to communicate with the server 106 via WI-FI, BLUETOOTH, cellular networks including EDGE, 3G and 4G wireless cellular systems, or any other wireless form of communication that is known.

At step S704, the processing circuitry of the server 106 receives one or more vehicle parameters from the smart vehicle 116. According to some implementations, smart vehicles employ one or more smart vehicle algorithms to provide additional driving aids, such as the automatic steering, driver distraction notifications, and the like. The smart vehicle algorithms can vary based on brand of vehicle, type of car, and/or version of software performing the smart vehicle algorithms. For example, different brands of vehicles may use different vehicle parameters and/or calculations for determining the location of a lane center, such as road curvature, location of exits, road width, number of lanes allocated to each direction of travel, and the like. The processing circuitry of the server 106 receives the one or more vehicle parameters from the at least one smart vehicle 116 via the network 104 that are used to execute the smart vehicle algorithms. According to certain embodiments, the processing circuitry can determine the vehicle parameters based on an identification code associated with the smart vehicle 116 that is transmitted to the server 106 when the smart vehicle establishes communications with the server at step S702.

At step S706, the processing circuitry of the server 106 determines traffic scheme-specific values for the vehicle parameters. For example, the smart vehicle 116 may use lane width and the total number of lanes allocated for each direction of travel to calculate a lane center and determine whether a driver has performed a dangerous driving action. The processing circuitry of the server 106 calculates the lane width for each lane and the total number of lanes allocated to each direction of travel based on the location of the vehicle on the illuminated road 114. In one implementation, the processing circuitry of the server 106 tracks the location and/or speed of the smart vehicle 116 on the illuminated road 114 via positioning sensors on the smart vehicle 116, such as a GPS receiver in order to determine the traffic scheme-specific values based on the location of the smart vehicle 116. In one implementation, the frequency with which the traffic-scheme specific values are determined is based on location and/or speed of the vehicle, traffic density on the illuminated road 114, and locations of traffic incidents. In addition, the frequency with which the traffic-scheme specific values are determined is based on a frequency with which the smart vehicle 116 performs computations associated with the smart vehicle algorithms.

At step S708, the processing circuitry outputs the traffic-scheme specific values to the smart vehicle 116 to assist with performing lane centering, driver notifications, and other smart vehicle capabilities. In one implementation, the processing circuitry of the server 106 outputs the traffic-scheme specific values to the smart vehicle 116 upon establishing communications with the smart vehicle 116 and then continues to update the traffic-scheme specific values after a predetermined period of time has passed. For example, the processing circuitry can output traffic-scheme specific values to the smart vehicle every 1 second, 5 seconds, 10 seconds, or any other time period. In one implementation, the processing circuitry outputs the traffic-scheme specific values to the smart vehicle 116 when the current traffic scheme is modified during the performance of the road illumination process 300. In some aspects, the traffic-scheme specific values are output to the smart vehicle whenever there is a change in one or the traffic-scheme specific values that is greater than a predetermined threshold.

A hardware description of server 106 according to exemplary embodiments is described with reference to FIG. 8. In addition, the hardware described by FIG. 8 can also apply to the computer 110 and the mobile device 112. When the server 106, computer 110, and/or mobile device 112 are programmed to perform the processes related to road illumination and vehicle integration described herein, the server 106, computer 110, and/or mobile device 112 becomes a special purpose device. Implementation of the processes of the road illumination system 100 on the hardware described herein improves the efficiency of illuminating the upper surface of the illuminated road 114 by determining optimal traffic schemes based on received traffic data and outputting control signals to the display layer 212 to output predetermined patterns to illuminate the upper surface of the illuminated road 114 in accordance with the optimal traffic schemes.

The server 106 includes a CPU 800 that perform the processes described herein. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 106 communicates, such as the computer 110.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

Figure 8:
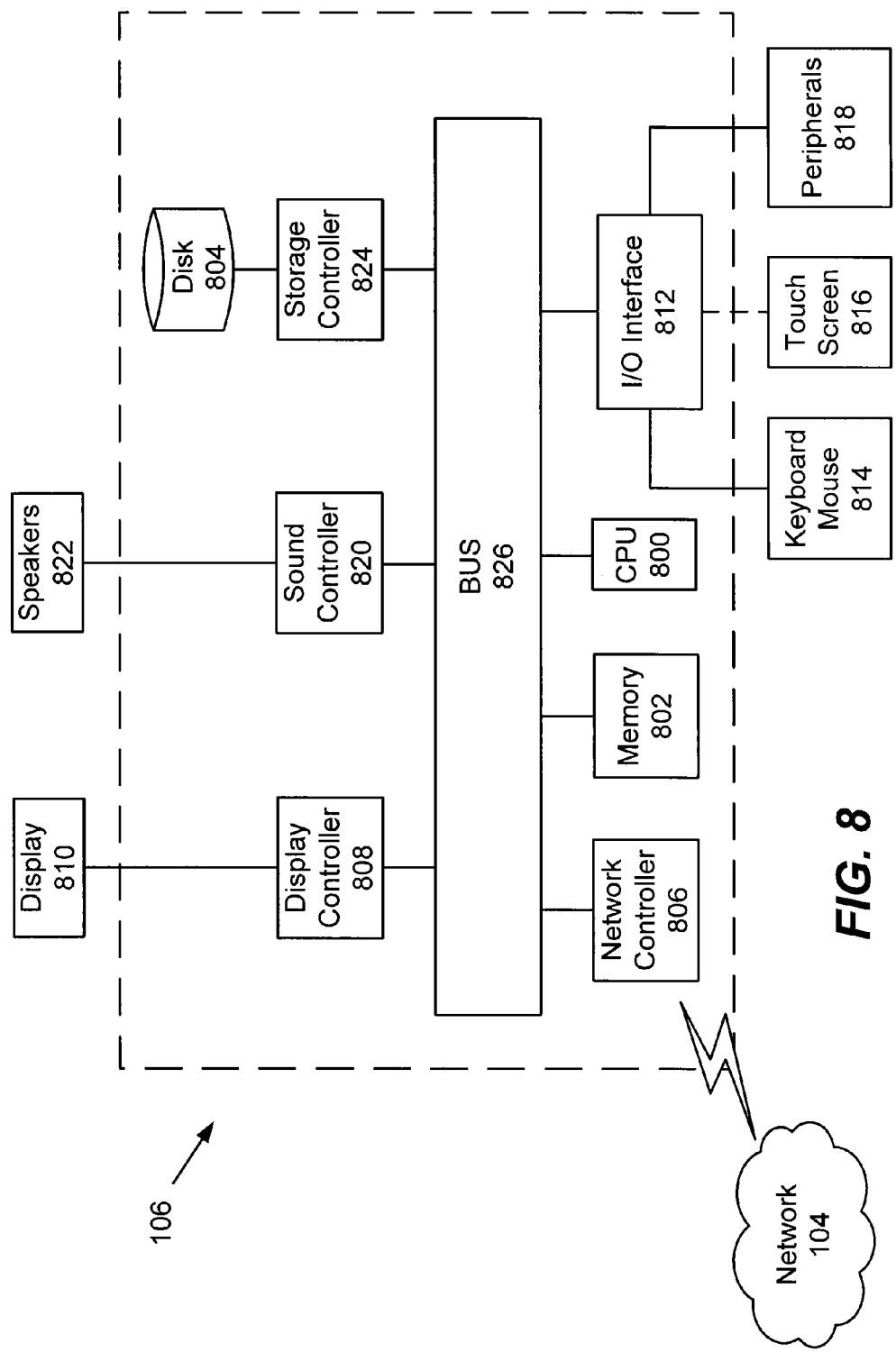
FIG. 8 illustrates a non-limiting example of a server, according to certain embodiments.

The server 106 in FIG. 8 also includes a network controller 1106, such as an Intel Ethernet PRO network interface card from Intel Corporation of America, for interfacing with network 104. As can be appreciated, the network 104 can be a public network, such as the Internet, or a private network such as an LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 106 further includes a display controller 808, such as a NVIDIA GeForce GTX or Quadro graphics adaptor from NVIDIA Corporation of America for interfacing with display 810 of the server 106 and the computer 110, such as an LCD monitor. A general purpose I/O interface 812 at the server 106 interfaces with a keyboard and/or mouse 814 as well as a touch screen panel 816 on or separate from display 810. General purpose I/O interface 812 also connects to a variety of peripherals 818 including printers and scanners.

A sound controller 820 is also provided in the server 106, such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the server 106. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

In other alternate embodiments, processing features according to the present disclosure may be implemented and commercialized as hardware, a software solution, or a combination thereof. Moreover, instructions corresponding to the road illumination process 300 and vehicle integration process 700 in accordance with the present disclosure could be stored in a thumb drive that hosts a secure process.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
a display layer disposed beneath one or more layers of a road that is configured to output light to illuminate an upper surface of the road;
one or more vertical cylindrical voids extending from the display layer to the upper surface of the road providing a path for the light from the display layer to reach the upper surface of the road; and
circuitry configured to
determine a traffic scheme for the road based on traffic data received from one or more sources,
issue control signals to the display layer to control illumination of the upper surface of the road in accordance with the traffic scheme, and
output traffic scheme-specific values to a smart vehicle corresponding to one or more smart vehicle algorithms.

2. The system of claim 1, wherein the one or more vertical cylindrical voids are filled with a translucent material allowing light to pass from the display layer to the upper surface of the road.

3. The system of claim 2, wherein the one or more vertical cylindrical voids include optical fibers that transmit the light from the display layer to the upper surface of the road.

4. The system of claim 1, wherein a diameter of the one or more vertical cylindrical voids is based on predetermined structural design criteria of the road.

5. The system of claim 1, wherein a distribution density of the one or more vertical cylindrical voids is based on predetermined structural design criteria of the road.

6. The system of claim 1, wherein the display layer includes one display surface covering an area of the road.

7. The system of claim 1, wherein the display layer includes a plurality of individual display surfaces corresponding to locations of the one or more vertical cylindrical voids.

8. The system of claim 1, wherein the display layer is configured to output one or more colors of light based on received control signals.

9. The system of claim 8, wherein the circuitry is further configured to determine the one or more colors of the light output by the display layer based on the traffic data.

10. The system of claim 1, wherein the circuitry is further configured to issue the control signals to the display layer to output predetermined illumination patterns to be displayed on the upper surface of the road.

11. The system of claim 10, wherein the circuitry is further configured to issue the control signals to the display layer to illuminate the upper surface of the road at one or more lane marker locations based on the traffic scheme.

12. The system of claim 10, wherein the circuitry is further configured to issue the control signals to the display layer to illuminate the upper surface of the road with one or more images corresponding to advertisements, brands, or notifications.

13. The system of claim 1, wherein the circuitry is further configured to determine a modified traffic scheme when one or more traffic incidents are present.

14. The system of claim 13, wherein the circuitry is further configured to determine a cost of implementing the modified traffic scheme based on a change in average vehicle speed or vehicle density.

15. The system of claim 14, wherein the circuitry is further configured to
implement the modified traffic scheme when the cost of implementing the modified traffic scheme is less than a predetermined threshold; and
maintain a current traffic scheme when the cost of implementing the modified traffic scheme is greater than or equal to the predetermined threshold.

16. The system of claim 1, wherein the circuitry is further configured to determine the traffic scheme-specific values corresponding to the one or more smart vehicle algorithms associated with the smart vehicle.

17. The system of claim 16, wherein the circuitry is further configured to determine updated traffic scheme-specific values for the smart vehicle at a frequency based on a speed or location of the smart vehicle.

18. The system of claim 1, wherein the traffic scheme data includes at least one of a road identifier, traffic scheme boundaries, direction of traffic flow for one or more lanes, lane marker colors, and a speed limit.

19. A method comprising:
determining, via circuitry, a traffic scheme for the road based on traffic data received from one or more sources;
issuing, via the circuitry, control signals to a display layer to control illumination of the upper surface of the road in accordance with the traffic scheme; and
outputting, to at least one smart vehicle, traffic scheme-specific values corresponding to one or more smart vehicle algorithms,
wherein the display layer is disposed beneath one or more layers of a road and is configured to output light to illuminate the upper surface of the road, and one or more vertical cylindrical voids extending from the display layer to the upper surface of the road provide a path for the light from the display layer to reach the upper surface of the road.

* * * * *